United States Patent Office 3,796,717
Patented Mar. 12, 1974

3,796,717
PRODUCTION OF o-AMINOMETHYLPHENYL-
ACETIC ACID LACTAM
Richard Root Smith and Lee Cannon Cheney, Fayetteville, N.Y., assignors to Bristol-Myers Company, New York, N.Y.
No Drawing. Filed Mar. 16, 1972, Ser. No. 235,422
Int. Cl. C07d 33/16
U.S. Cl. 260—289 R          1 Claim

ABSTRACT OF THE DISCLOSURE

Yields in the production of o-aminomethylphenylacetic acid are improved by first reacting 2-indanone oxime with phosphorus pentachloride to produce o-aminomethylphenylacetic acid lactam which is then refluxed in hydrochloric acid to produce o-aminomethylphenylacetic acid hydrochloride.

BACKGROUND OF THE INVENTION (1) Field of the invention

This invention provides improved chemical processes for the production of 3-oxotetrahydroisoquinoline, which is also called 3-hydroxy-1,2-dihydroisoquinoline, 1,4-dihydro-3(2H)-isoquinolone and o-aminomethylphenylacetic acid lactam, and for its conversion to o-aminomethylphenylacetic acid and its salts.

(2) Description of the prior art 1,4-dihydro-3(2H)-isoquinolone (Chem. Abst. 47, 3813f) has the structure

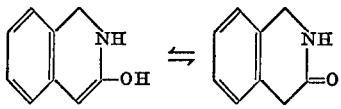

It has been reported, for example, in Chemical Abstracts 20, 392, in Beilstein 21, II, 255, by V. Braun et al., Annalen, 445 240 (1925) and by R. Huisgen et al., Annalen 575, 197–216 [C.A. 47, 3813f].

o-Aminomethylphenylacetic acid has the structure

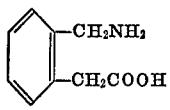

It was prepared, for example, by V. Braun (ibid). It was also prepared by a lengthy and laborious synthesis by J. Haginiwa et al., J. Pharm. Soc. Japan, 79(12), 1578–1581 (1959). Haginiwa et al. then acylated the amino group and heated the resulting amides with soda lime to produce a series of 3-substituted-isoquinolines.

o-Aminomethylphenylacetic acid was also synthesized laboriously by R. U. Lemieux and R. Raap as disclosed in their U.S. patent application Ser. No. 142,337, filed May 11, 1971. Lemieux et al. used this acid, after appropriate blocking of the free amino group, to acylate 7-aminocephalosporanic acid and derivatives thereof and thus, after removal of the blocking group, to produce potent antibacterial agents such as the compound of the formula

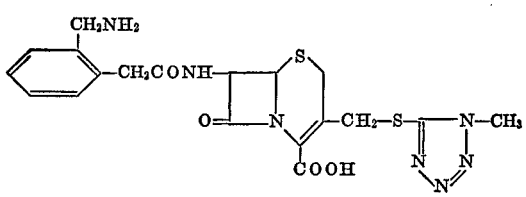

SUMMARY OF THE INVENTION

This invention includes the improved process for the production of o-aminomethylphenylacetic acid lactam which comprises cooling below 0° C. and preferably to about −30° C. a suspension of 2-indanone oxime in a substantially anhydrous organic solvent, preferably chloroform, and then gradually adding phosphorus pentachloride to said mixture while maintaining the temperature of the mixture below 0° C. and preferably in the range of −28° C. to −32° C.

There is also disclosed the process for the production of o-aminomethylphenylacetic acid hydrochloride which comprises heating, preferably to reflux, a mixture of o-aminomethylphenylacetic acid lactam and concentrated hydrochloric acid followed if desired by neutralization of the hydrochloride with ammonium hydroxide.

The improved procedure of the present invention is provided by Beckmann rearrangement of 2-indanone oxime followed by hydrolysis of the resulting lactam according to the following equation:

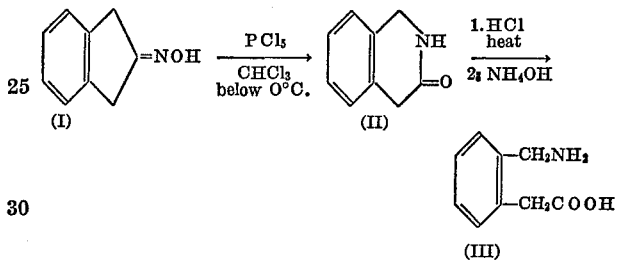

J. Org. Chem. 9, 380–391
(1944) and 28, 2797–2804 (1963).

DESCRIPTION OF THE PREFERRED EMBODIMENTS

EXAMPLE 1

| Materials | Weight, g. | Volume, ml. | Moles |
|---|---|---|---|
| 2-indanone oxime | 1,000 |  | 6.78 |
| Phosphorus pentachloride | 1,482 |  | 7.13 |
| Chloroform |  | 56,600 |  |
| 10% sodium hydroxide solution |  | 680 |  |
| "Darko KB" activated charcoal | 1,000 |  |  |

Procedure (1) Dissolve 1000 g. of 2-indanone oxime in 31,600 ml. of chloroform at 20–25° C.

(2) Cool the solution to −30° C. [On cooling the 2-indanone oxime solution to −30° C., some of the oxime crystallizes.]

(3) Add 1482 g. of phosphorus pentachloride to the vigorously stirred suspension in portions. Control the temperature of the reaction at −28° to −32° C. by the rate of addition of the solid phosphorus pentachloride. [The best results were obtained on running the reaction at −30° C. It can also be successfully run at −10 to −5° C. or perhaps even higher but it appears that more tar and side products are produced which then complicate isolating the lactam.]

(4) Stir the reaction at ~−30° C. for 10 minutes after completing the addition and then warm it to 25° C. over ¾ hr. During this period the solids dissolve and then a new solid reprecipitates.

(5) Stir the reaction at 25° C. for 3 additional hours and then with thorough mixing add it to 31,600 ml. of water at 0–5° C. [The reaction can be followed by TLC (thin layer chromatography). In the system of 8 parts benzene and 2 parts acetic acid the lactam has an $R_f$=.36 and the oxime has as $R_f$=.64. The spots are developed by .05% potassium permanganate spray. The oxime spot may not completely disappear but it should become quite faint.] Subsequent washing operations were conducted at 20–25° C.

(6) Separate the layers and wash the chloroform phase with 15,800 ml. of water.

(7) Combine the water fractions and extract them with 15,800 ml. of chloroform.

(8) Combine the chloroform fractions, layer with 15,800 ml. of water and with good mixing titrate the mixture to ~pH 7 with 10% sodium hydroxide solution. This may take about 680 ml. of sodium hydroxide solution and the titration is slow. [This basic wash is important in removing the tar producing side products. The titration may take 1 to 2 hours.]

(9) Separate the layers and wash the chloroform with 15,800 ml. of water.

(10) Combine the water fractions, wash with 9200 ml. of chloroform and combine the chloroform fractions.

(11) Carbon treat the chloroform solution with 1000 g. of activated charcoal ("Darko KP") at ~25° for 15–30 min.

(12) Filter the slurry through diatomaceous earth ("Dicalite") wash the cake with chloroform and concentrate the filtrate at reduced pressure to leave o-aminomethylphenylacetic acid lactam as a dry solid.

(13) The yield of crude lactam is nearly 100%. It is a yellow crystalline solid. [If the tar making materials have not been removed by the washes, this product will come out dark. It can be recrystallized from hot water after first adjusting the water slurry to pH 7.0 or from toluene-heptane.]

EXAMPLE 2

| Materials | Weight, g. | Volume, ml. | Moles |
|---|---|---|---|
| Crude o-aminomethylphenyl acetic acid lactam from 1,000 g. of 2-indanone oxime | ~1,000 | | ~6.78 |
| Conc. hydrochloric acid | | 8,000 | |
| "Darko KB" activated charcoal | 100 | | |
| Methylene chloride | | 6,000 | |
| Methyl isobutyl ketone (MIBK) | | (¹) | |
| 6 N ammonium hydroxide | | (¹) | |

¹ As needed.

Procedure (1) Add 8000 ml. of concentrated hydrochloric acid to the approximately 1000 g. of crude lactam obtained from oxime rearrangement.

(2) Stir the mixture and heat it cautiously to reflux for 3 hours. [On heating this reaction an excessive amount of foam is formed as excess HCl leaves. This foam can fill the whole apparatus. It can be reduced by silicon, antifoam agent. After the initial foam stage is passed, the reaction can be refluxed without difficulty.]

(3) Cool the dark slurry to about 40–50° C. and add 100 g. of activated charcoal ("Darko KB") and continue stirring.

(4) Carbon treat for 15–20 min., filter the slurry through a "Dicalite" cake and wash the cake with about 4000 ml. of hot water.

(5) Extract the clear yellow filtrate with 6000 ml. of methylene chloride (½ volume) and separate the methylene chloride. Save the $CH_2Cl_2$ layer for checking possible recovery of unchanged lactam.

(6) Concentrate the water phase at reduced pressure to give solid o-aminomethylphenylacetic acid hydrochloride.

(7) Add MIBK to the wet solids and continue the reduced pressure distillation and MIBK addition until all the water has been removed from the solids.

(8) Continue the reduced pressure distillation until all the MIBK has been removed from the solids. [The MIBK distillation not only azeotropes the water but also takes excess HCl with it.]

(9) Redissolve the solids in 3900 ml. of water and add 650 ml. of MIBK.

(10) While stirring at 20–25° C. adjust the pH of the solution to 5.0 with 6 N ammonium hydroxide. The o-aminomethylphenylacetic acid zwitterion starts to crystallize at about pH 3.5.

(11) Stir the zwitterion slurry and cool it to 0–5° C. for 1 hr.

(12) Filter the slurry, wash the cake carefully with ~1000 ml. of ice cold water, then 2000 ml. of MIBK and then 5000 ml. of ice cold acetone. The combined filtrate and washes should be checked for lactam content.

(13) Suck the cake dry and then dry it in an air circulating oven at 45° C. The yield is 670–730 g.; 60–65% based on oxime.

(14) The reactions and processing may be followed by TLC using the solvent system 5 acetone, 1.5 benzene, 1.0 acetic acid, 1.5 water; developed by $KMnO_4$; $R_f$ lactam=0.88, $R_f$ amino acid=0.69.

What is claimed is:

1. The process for the production of o-aminomethylphenylacetic acid lactam which consists essentially of cooling to about −30° C. a mixture of 2-indanone oxime in chloroform as a substantially anhydrous organic solvent, and then gradually adding at least one part by weight of phosphorus pentachloride to said mixture while maintaining the temperature of the mixture at about −30° C.

References Cited
UNITED STATES PATENTS

| 2,227,876 | 1/1941 | Bolt | 260—289 R |
| 2,991,286 | 7/1961 | Corsow | 260—239.3 A |
| 3,045,008 | 7/1962 | Combardino | 260—239.3 A |
| 3,310,565 | 3/1967 | Galantay | 260—289 R |

OTHER REFERENCES

Levin et al., Jour. Org. Chem., vol. 9, pp. 380–91 (1944).

Rosen et al., Jour. Org. Chem., vol. 28, pp. 2797–2804 (1963).

Donaruma et al. in Organic Reaction, vol. 11, pp. 55–6, 105 (1960).

DONALD G. DAUS, Primary Examiner

U.S. Cl. X.R.
260—243 C, 283 SY, 518 R, 566 A